US008165981B2

(12) United States Patent
Colena et al.

(10) Patent No.: US 8,165,981 B2
(45) Date of Patent: Apr. 24, 2012

(54) DYNAMIC CONSTRAINT SATISFACTION PROBLEM SOLVER THAT RECREATES STRUCTURE ACROSS SESSIONS

(75) Inventors: Michael Colena, Lowell, MA (US); Claire M. Bagley, Carlisle, MA (US)

(73) Assignee: Oracle International Corporation, Redwood Shores, CA (US)

( * ) Notice: Subject to any disclaimer, the term of this patent is extended or adjusted under 35 U.S.C. 154(b) by 484 days.

(21) Appl. No.: 12/430,600

(22) Filed: Apr. 27, 2009

(65) Prior Publication Data

US 2010/0036787 A1 Feb. 11, 2010

Related U.S. Application Data

(60) Provisional application No. 61/087,254, filed on Aug. 8, 2008.

(51) Int. Cl.
*G06F 17/00* (2006.01)
*G06N 5/02* (2006.01)

(52) U.S. Cl. ........................................ 706/46
(58) Field of Classification Search ........................ None
See application file for complete search history.

(56) References Cited

U.S. PATENT DOCUMENTS

| 7,010,746 | B2 | 3/2006 | Purvis |
| 7,069,537 | B2 | 6/2006 | Lazarov |
| 7,236,983 | B1 | 6/2007 | Nabors et al. |
| 7,333,968 | B2 | 2/2008 | Geller et al. |
| 7,584,079 | B2 | 9/2009 | Lichtenberg et al. |
| 2002/0010655 | A1 | 1/2002 | Kjallstrom |
| 2002/0107749 | A1 | 8/2002 | Leslie et al. |
| 2002/0143653 | A1 | 10/2002 | DiLena et al. |
| 2002/0166089 | A1 | 11/2002 | Noy |
| 2004/0019852 | A1 | 1/2004 | Purvis |
| 2004/0111327 | A1 | 6/2004 | Kidd et al. |
| 2005/0044525 | A1 | 2/2005 | Lazarov |
| 2005/0198621 | A1 | 9/2005 | Tillmann et al. |
| 2005/0278271 | A1 | 12/2005 | Anthony et al. |
| 2006/0184468 | A1* | 8/2006 | Adir et al. ........................ 706/16 |
| 2007/0094184 | A1 | 4/2007 | Emek et al. |
| 2007/0112609 | A1* | 5/2007 | Howard et al. ..................... 705/8 |
| 2008/0228657 | A1 | 9/2008 | Nabors et al. |

OTHER PUBLICATIONS

Frühwirth, Thom et al., "Principles of Constraint Systems and Constraint Solvers", Archives of Control Sciences: Special Issue on Constraint Programming, 16(2) http://www.informatik.uni-ulm.de/pm/mitarbeiter/fruehwirth/Papers/acs-systems3.pdf, 2006.

Lhomme, Olivier, "Consistency Techniques for Numeric CSPs", Proceedings in IJCAI-93 pp. 232-238, 1993 Chambery, France.

Selectica, "Selectica Configuration", Solution Overview, 2005, Selectica, Inc., San Jose, CA.

(Continued)

*Primary Examiner* — Jeffrey A Gaffin
*Assistant Examiner* — Luis Sitiriche
(74) *Attorney, Agent, or Firm* — Squire Sanders (US) LLP (57) ABSTRACT

A dynamic constraint solver for solving a constraint satisfaction problem model receives a request for a current solving session to recreate a first solving session for the model. The solver then collects a deferred port list comprising one or more ports in the model that need a sub-problem and creates one or more runtime constraints for the model. For each of the created runtime constraints, the solver propagates the constraint and determines if the propagation generates a conflict. If the propagation generates a conflict, the solver dismisses the constraint and reverts the model to a state before the constraint was propagated.

16 Claims, 5 Drawing Sheets

OTHER PUBLICATIONS

ILOG, "ILOG Configurator, Powering online product and service configuration applications", Product Datasheet, Mar. 2005, ILOG. S.A.

Oracle, "Oracle Configurator", Oracle Data Sheet, 2008, Oracle.

Tacton, "Tacton's Sales Configurator—Bridging the gap between engineering and sales for selling customized products.", http://www.tacton.com/templates/page_68.aspx?epslanguage=EN, 2007, Tacton Systems AB, Sweden.

Benhamou, Frédérick et al., "Applying Interval Arithmetic to Real, Integer and Boolean Constraints", Journal of Logic Programming, 32(1), 1997.

Sabin, Daniel et al., "Configuration as Composite Constraint Satisfaction", Proceedings of the ($1^{st}$) Artificial Intelligence and Manufacturing Research Planning Workshop, 1996.

Ulrich, Junker et al., "Preference programming: Advanced problem solving for configuration", pp. 13-29, 2002.

Narendra Jussien et al., "Dynamic domain splitting for numeric CSPS", pp. 225-227, 1998.

Fleischanderl, Gerhard et al., "Configuring Large Systems Using Generative Constraint Satisfaction", IEEE, pp. 59-68, No. 1094-7167/98, Jul./Aug. 2008, IEEE.

Mittal, Sanjay et al., "Dynamic Constraing Satisfaction Problems", Proceedings of the Eighth National Conference on Artificial Intelligence, 1996.

Stumptner, Markus et al., "Generative Constraint-Based Configuration of Large Technical Systems", Artificial Intelligence for Engineering Design, analysis and Manufacturing, pp. 307-320, No. 12, 1998, Cambridge University Press, USA.

Gelle, Esther et al., "Solving Methods for Conditional Constraint Satisfaction", IJCAL, 2003.

* cited by examiner

DYNAMIC CONSTRAINT SATISFACTION PROBLEM SOLVER THAT RECREATES STRUCTURE ACROSS SESSIONS

RELATED APPLICATIONS

This application claims the benefit of U.S. Provisional Application No. 61/087,254, filed Aug. 8, 2008.

FIELD OF THE INVENTION

One embodiment is directed generally to a computer system, and in particular to a constraint based computer system that solves dynamic constraint satisfaction problems.

BACKGROUND INFORMATION

Many of the tasks that are addressed by decision-making systems and artificial intelligence systems can be represented as constraint satisfaction problems ("CSP"s). In this representation, the task is specified in terms of a set of variables, each of which can assume values in a given domain, and a set of constraints that the variables must simultaneously satisfy. The set of variables, domains and constraints is referred to as a CSP. Each constraint may be expressed as a relation, defined over some subset of the variables, denoting valid combinations of their values. A solution to a CSP is an assignment of a value to all the variables from their respective domains that satisfies all of the constraints.

A constraint based system includes a constraint solver that attempts to find one or more solutions to a given CSP, or prove that no solution exists. Constraint based systems are used for many artificial intelligence related applications and a variety of other applications, including: (1) Product configurators; (2) Robotic control; (3) Temporal reasoning; (4) Natural language processing; (5) Spatial reasoning; (6) Test-case generation for software and hardware systems; (7) Machine vision; (8) Medical diagnosis; (9) Resource allocation; and (10) Frequency allocation.

The network of constraints in a CSP can be viewed as a graph, having a node for each variable and an "arc" for each constraint. The members of each arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc.

Classes of problems exist which are comprised of very large sets of variables that may only be conditionally related or required for a solution. One example of such problems is the configuration of large component-based systems. For example, selecting a type of hard disk controller for a computer configuration is not needed if a hard disk has not been chosen as a form of storage. If instead flash memory is chosen, a different set of variables and constraints would be required to be solved. Known CSP solvers do not allow the representation of conditional structure or reasoning over an inclusion of a variable in a solution. Techniques have been developed to allow such large problems to be represented as a set of smaller sub-problems, conditionally related through composition or association. A "dynamic constraint satisfaction problem" is one in which these sub-problems of variables and constraints can be incrementally added as required, either explicitly or as a result of inference from the propagation of constraints.

One known approach to minimize large CSP problems is referred to as "Conditional CSP", and includes the notion of a variable being active or inactive, as well as constraints to activate a variable. In this approach, a variable is only assigned a value in the final solution if it is active. Conditional CSP is limited in that it does not provide any significant space savings in large problems, nor does it allow for segmentation of related variables into sub-problems. Another known approach is referred to as "Generative CSP" and extends Conditional CSP by introducing the concept of components, which are groups of related variables, and component type, which is the further extension and specialization of these components. However, similar to Conditional CSP, Generative CSP is still implemented in terms of activity state and does not provide real space savings.

SUMMARY OF THE INVENTION

One embodiment is a dynamic constraint solver for solving a constraint satisfaction problem model. The solver receives a request for a current solving session to recreate a first solving session for the model. The solver then collects a deferred port list comprising one or more ports in the model that need a sub-problem and creates one or more runtime constraints for the model. For each of the created runtime constraints, the solver propagates the constraint and determines if the propagation generates a conflict. If the propagation generates a conflict, the solver dismisses the constraint and reverts the model to a state before the constraint was propagated.

DETAILED DESCRIPTION

One embodiment is a dynamic constraint satisfaction problem solver that recreates structure when a CSP model has changed between execution sessions or when duplicating a session. Therefore, the solver may provide maximum structural persistency across multiple sessions.

Figure 1:
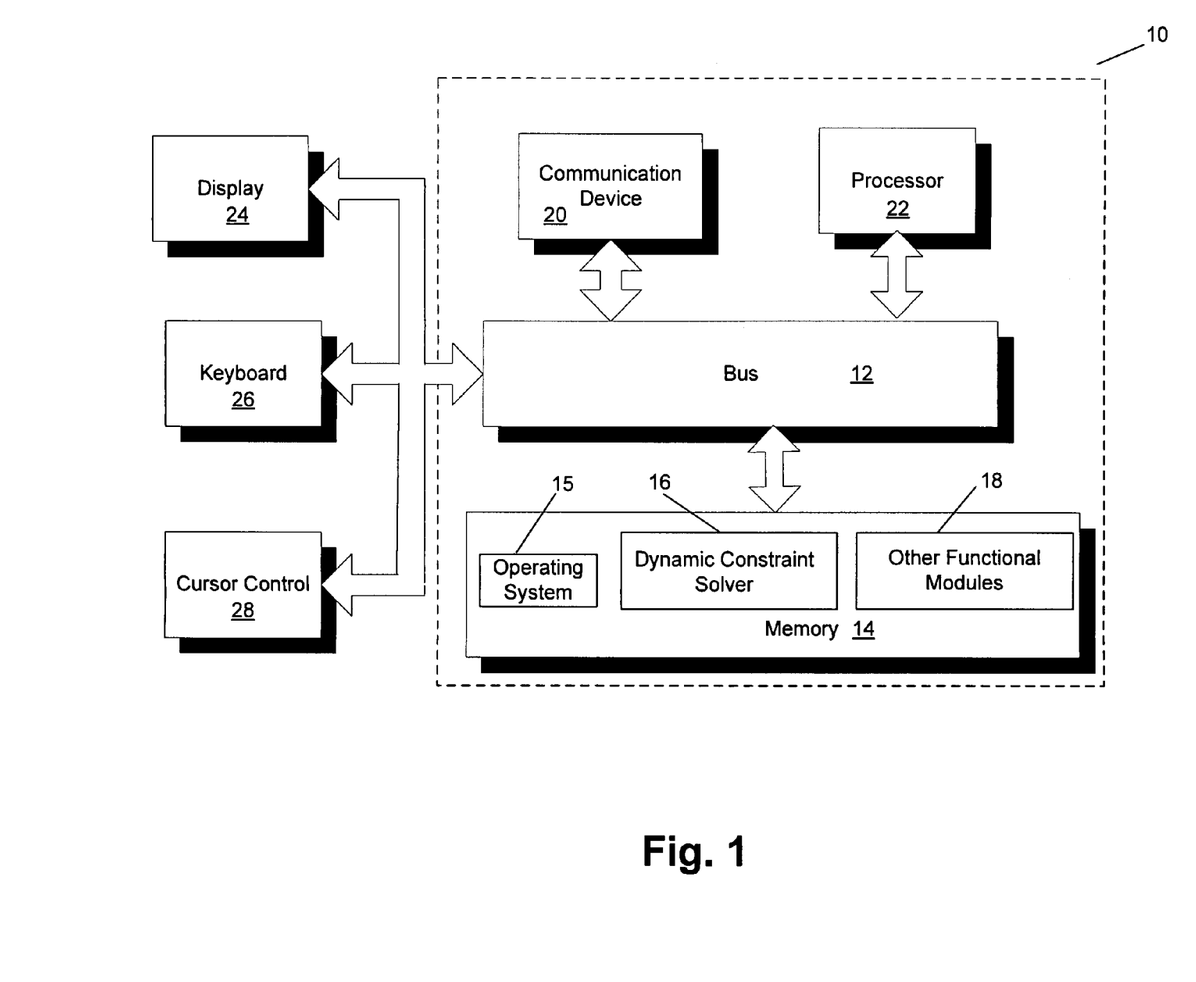
FIG. 1 is a block diagram of a dynamic constraint based system that can implement an embodiment of the present invention.

FIG. 1 is a block diagram of a dynamic constraint based system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user, such as configuration information. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a dynamic constraint solver module 16 that performs dynamic constraint solving for CSP models and can recreate structure across sessions as disclosed in more detail below. System 10 can be part of a larger system that includes a constraint solver, such as a product configurator or artificial intelligence system. Therefore, system 10 will typically include one or more additional functional modules 18 to include the additional functionality.

Figure 2:
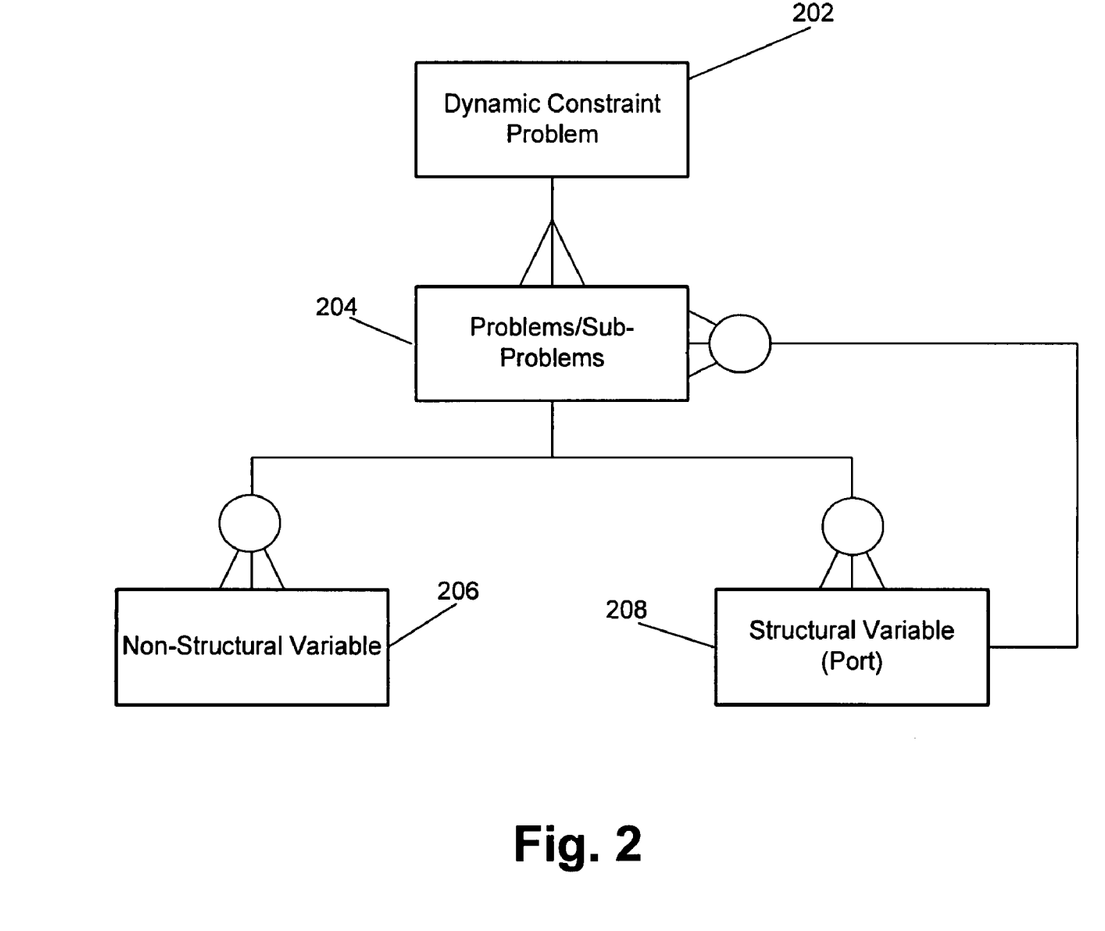
FIG. 2 illustrates the hierarchy of a model of a dynamic constraint problem 202 in accordance with one embodiment.

FIG. 2 illustrates the hierarchy of a model of a dynamic constraint problem 202 in accordance with one embodiment. Dynamic constraint problem 202 includes one or more problems or sub-problems 204 (a "sub-problem" may also be a "problem", and vice versa depending on where it falls in the hierarchy). In an embodiment where the dynamic constraint problem is for a product configurator, the problems/sub-problems are the components/sub-components of the configurator.

Each problem 204 is formed of zero or more non-structural variables 206. Examples of non-structural variables 206 includes Boolean variables, integers, floating point variables, etc. Each problem 204 may also include zero or more structural variables or "ports" 208. A port is a container for problems and connects sub-problems to the problem or to another sub-problem or acts as an extension point from one problem to another problem. Each port 208 can be connected to zero or more sub-problems 204. A port may be defined by two items: (a) the definition of the problem to be connected to the port; and (b) a numeric domain representing how many instances of the problem is required or allowed in the port (referred to as the port's "cardinality").

When solving dynamic constraint satisfaction problems, an assertion of constraints can sometimes lead to the creation of inferred sub-problems. The generation and placement of inferred sub-problems often exhibit symmetry under the interchange of sub-problem associations. For example, consider a computer system composed of cards in slots. If a solution consisting of card A in slot 1 and card B in slot 2 satisfies a given set of requirements, it is possible that the solution consisting of card B in slot 1 and card A in slot 2 is equally satisfactory. This symmetry introduces a degree of arbitrariness to the way in which inferences involving sub-problem creation and association are exhibited during an interactive session. Having determined, for instance, that card A is required in the solution, a constraint solver may reasonably place it in slot 1, even though it may equally well have been placed in slot 2.

In general, an interactive constraint solver system propagates constraints and infers the maximum amount of domain pruning for each constraint, preference, or selection that is added to the system. Frequently, there may be a changes to the constraint model or propagation technique across multiple user solution sessions, which can lead to a different arbitrary but valid sub-problem association than was witnessed by a user in the original session. For example, a user may be building a computer by interacting with a computer product configurator. The computer may be partially built, and the user may then stop the configuration, and resume the configuration after a duration of time. In the meanwhile, the model for the computer may have changed by, for example, adding a new constraint that the computer must include a network card. This new constraint can potentially change all or most of the arbitrary associations from the previous interactive session, thus causing the structure/configuration to change.

However, for many solver applications, such as product configurators, it is beneficial to preserve previously made arbitrary associations between sessions if they are still valid, in order to ensure the stability of the view of the solution presented to the interactive user. For one, it is disconcerting for an interactive user to have the structure change from one session to another. Further, there are situations where it is required to exactly recreate the previous state of a dynamic constraint satisfaction problem. One such situation is when introducing new constraints to an established solution in order to search for a new solution. Another situation is when duplicating a problem state for the purpose of performing parallel searches for divergent solutions.

In one embodiment, when a new interactive user session is initiated, or when a session needs to be duplicated, solver 16 recreates the previous or primary structure, including arbitrary problem/sub-problem associations. Solver 16 preserves the structure, if possible, even if the CSP model has changed between sessions. In one embodiment, the previous structure is recreated by first creating the sub-problems in a manner that defers inference of sub-problem associations. This is done to prevent the creation and inferred associations of further sub-problems based on the propagation of model constraints.

Figure 3:
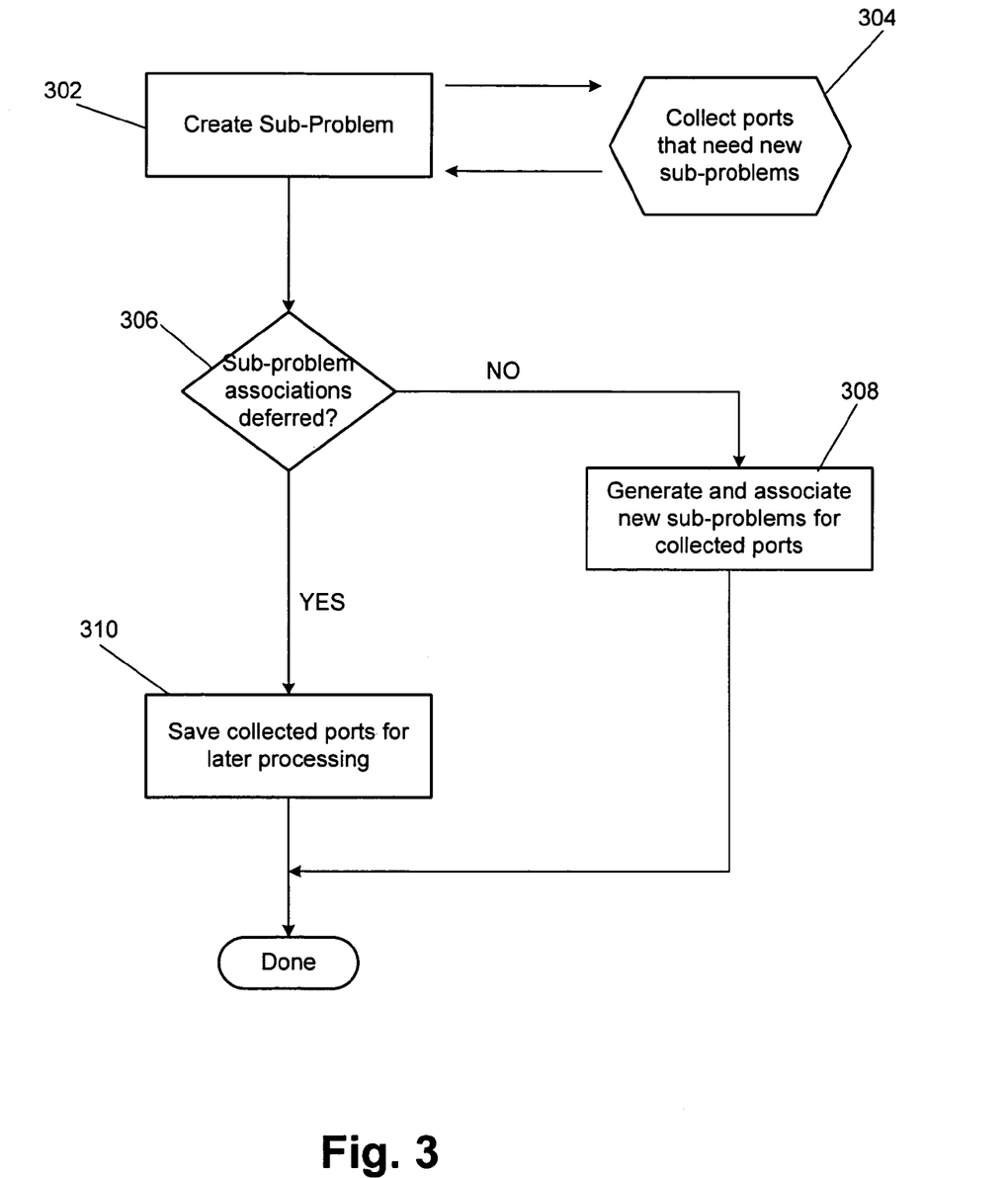
FIG. 3 is a flow diagram of the functionality of the dynamic constraint solver module when the previous structure of an earlier session is recreated in a new session (or duplicated from another session) by first creating the sub-problems in a manner that defers inference of sub-problem associations/constraints in accordance with one embodiment.

FIG. 3 is a flow diagram of the functionality of dynamic constraint solver module 16 when the previous structure/state/configuration of another session is recreated in a new session, or when a session is being recreated so it can be duplicated, by first creating the sub-problems in a manner that defers inference of sub-problem associations/constraints in accordance with one embodiment. Solver 16 further stores and retains for future processing any ports/sub-problem sets. In one embodiment, the functionality of the flow diagram of FIG. 3, and FIGS. 4 and 5 below, is implemented by software stored in memory or other computer readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, the first sub-problem from the previous or first session is created. In conjunction with creating the sub-problem, the ports for the sub-problem that need new sub-problems, and therefore would generate inferred sub-problems, are collected at 304. For example, a card A (i.e., a sub-problem) may include a port to a card B, and the port to card B may include one card B (i.e., a sub-problem). Therefore, the port to card B would be collected at 304 when creating the card A sub-problem at 302.

At 306, it is determined if the sub-problem associations should be deferred. Associations will be deferred if they are connected to a port that needs a new sub-problem, which was collected/stored at 304.

If the sub-problem associations do not need to be deferred, at 308 new sub-problems for the collected ports are generated and associated.

If the sub-problem associations need to be deferred, at 310 the collected ports are saved for later processing.

The functionality of FIG. 3 is repeated for each sub-problem that is created when recreating a session.

Figure 4:
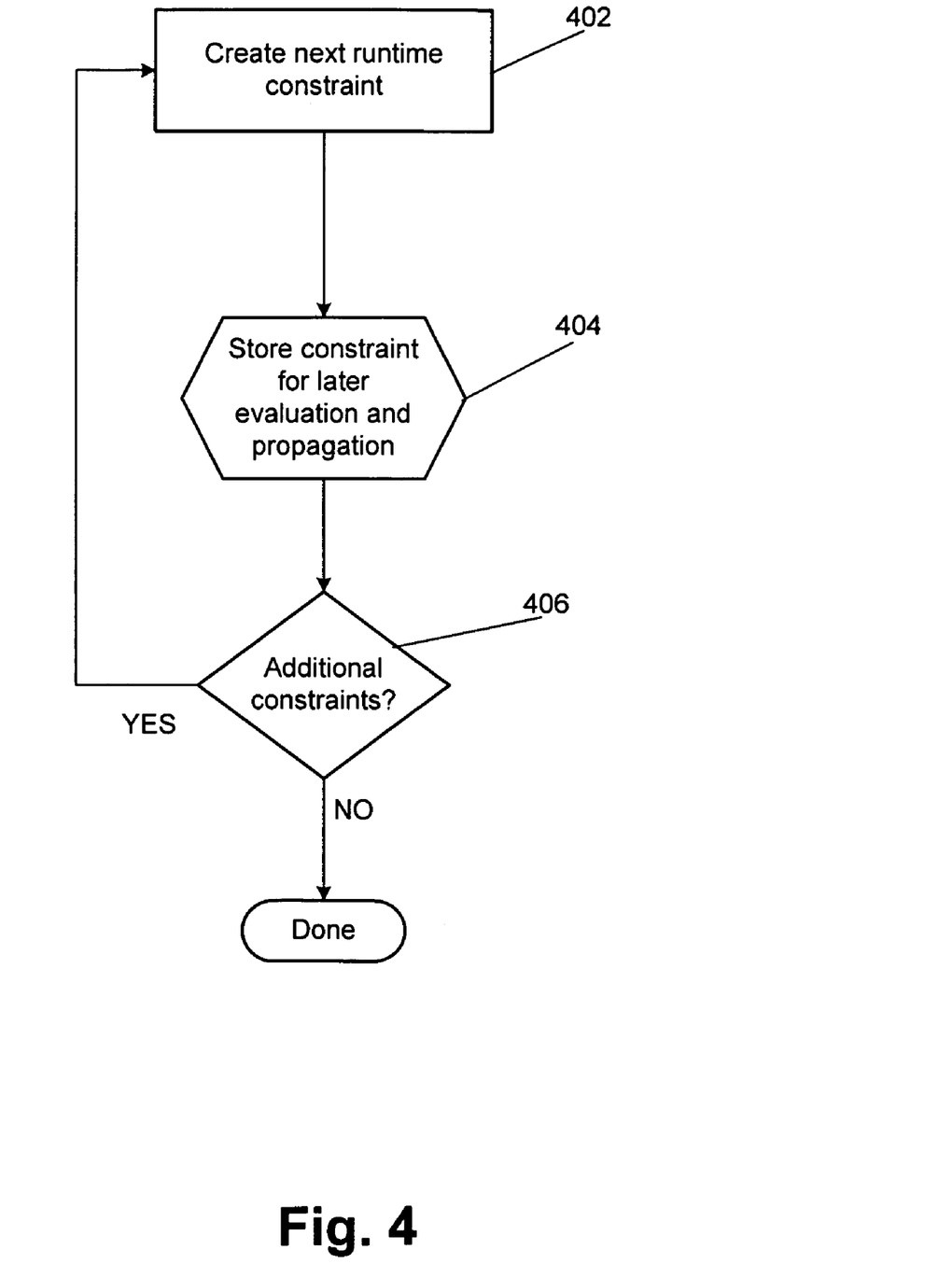
FIG. 4 is a flow diagram of the functionality of the dynamic constraint solver module when creating runtime constraints while recreating or duplicating another session in accordance with one embodiment.

After some of the sub-problem associations are inferred in FIG. 3, solver 16 then creates runtime constraints, which include the inferred sub-problem associations, in a manner that defers the constraint evaluation and propagation. This is done to prevent creation and inferred associations of further sub-problems caused by the propagation of runtime constraints. FIG. 4 is a flow diagram of the functionality of dynamic constraint solver module 16 when creating runtime constraints while recreating a previous session or duplicating a session in accordance with one embodiment.

At 402, the first or next runtime constraint is created.

At 404, the constraint is stored for later evaluation and propagation.

At 406, it is determined if there are additional constraints. If no, the functionality of FIG. 4 is ended. If yes, functionality resumes at 402.

Therefore, when the functionality of FIG. 4 is completed, all created constraints are stored and retained for future processing. These stored constraints comprise all of the original containment constraints from the previous or first session.

Figure 5:
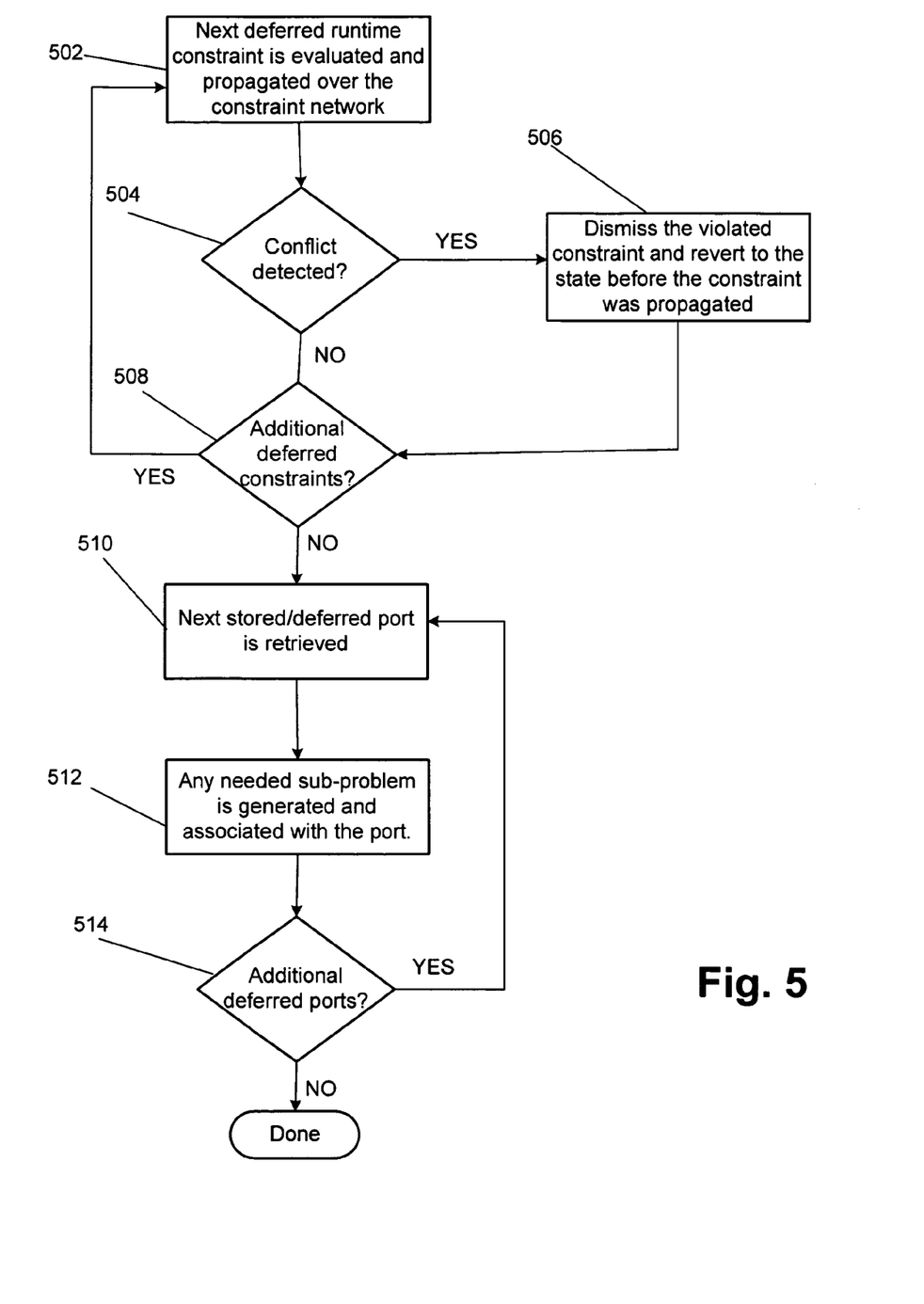
FIG. 5 is a flow diagram of the functionality of the dynamic constraint solver module when propagating, as a batch, the set of deferred sub-problems and constraints that were collected and stored in FIGS. 3 and 4 in accordance with one embodiment.

Solver 16 then propagates, as a batch, the set of propagation-deferred sub-problems and constraints, in order to ensure preference of explicitly recreated sub-problem associations. This allows for the explicit creation and association of sub-problem substructure to be completed, and take precedence over any new associations that may result from propagation. FIG. 5 is a flow diagram of the functionality of dynamic constraint solver module 16 when propagating, as a batch, the set of deferred sub-problems and constraints that were collected and stored in FIGS. 3 and 4 above in accordance with one embodiment.

At 502, the first or next deferred runtime constraint from FIG. 4 is evaluated and propagated over the constraint network.

At 504, it is determined if a conflict is detected based on the propagation. In one embodiment, a conflict will be detected at 504 if the model was changed since the last session. If the model was not changed, there should be no conflict detected at 504.

If a conflict is detected at 504, at 506 solver 16 dismisses (i.e., does not assert) the violated constraint and reverts to the state before the constraint was propagated. Therefore, a single constraint that causes a conflict will be removed/dismissed rather than dismissing all restored constraints in the event of a conflict. In one embodiment, the "dismissed" constraints are stored so solver 16 can inform the user (via, e.g., a user interface) about the dismissed constraints once the structure recreation is complete.

If no conflict is detected at 504, at 508 it is determined if there are additional stored runtime constraints. If yes, functionality resumes at 502. Otherwise, functionality moves to 510. When 510 is reached, all saved runtime constraints, which include inferred sub-problem associations, will have been propagated if possible. Processing the inferred associations before new sub-problem associations occur ensures that the implicit dynamic structure of the previous session is replicated.

At 510, the first or next stored/deferred port from FIG. 3 is retrieved.

At 512, if the retrieved port needs a sub-problem, the sub-problem is generated and associated with the port.

At 514, it is determined if there are additional deferred ports. If not, the functionality ends. If there are additional ports, the functionality resumes at 510.

In one embodiment, the functionality of FIG. 5 ensures that runtime constraints that lead to conflict in the batch propagation do not cause failure of the batch. Solver 16 reverts the individual violated runtime constraints and asserts all those that do not lead to a violation. This results in the success of a maximum number of batch-asserted runtime constraints that might otherwise might not have been asserted during re-creation of the structure, as opposed to an "all or nothing" behavior. A conflict detected in a single evaluated runtime constraint only causes the dismissal of that one constraint.

As disclosed, an embodiment is a solver for a dynamic CSP that includes structural persistence to provide a stable component structure during user interaction and modification of the solution. By ensuring structural persistency across multiple execution sessions, embodiments allow an interactive solution search to span multiple execution sessions. It provides consistency between sessions in spite of any changes that may occur to the problem definition or the propagation algorithms of the underlying solver system.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to function as a dynamic constraint solver for solving a constraint satisfaction problem model, the instructions comprising:

receiving a request for a current solving session to recreate a first solving session for the model, wherein the model comprises at least one problem comprising at least one non-structural variable and a port, and at least one sub-problem coupled to the problem via the port and comprising at least one non-structural variable;

collecting a deferred port list comprising one or more ports in the model that need a sub-problem and that generated inferred sub-problems in the first solving session;

creating one or more runtime constraints for the model;

for each of the created runtime constraints, propagating the constraint and determining if the propagation generates a conflict; and if the propagation generates a conflict, dismissing the constraint and reverting the model to a state before the constraint was propagated;

wherein the current solving session is resumed by a user after the first solving session has been stopped, and the model may have changed from the first solving session to when the current solving session is resumed.

2. The computer readable medium of claim 1, further comprising:

for each of the ports on the deferred port list, generating the sub-problem and associating the generated sub-problem with the port.

3. The computer readable medium of claim 1, wherein the model has changed from the first solving session to the current solving session.

4. The computer readable medium of claim 3, wherein the changed model comprises a least one new constraint.

5. The computer readable medium of claim 1, wherein at least one of the runtime constraints comprises an arbitrary association of a problem from the first solving session.

6. The computer readable medium of claim 1, wherein the dynamic constraint solver is a product configurator and the sub-problem is a component.

7. The computer readable medium of claim 1, wherein the solver is an interactive system and the constraint is a user decision.

8. A constraint solver comprising:
   a constraint satisfaction problem model that is changed from a first solving session for a current solving session, wherein the model comprises at least one problem comprising at least one non-structural variable and a port, and at least one sub-problem coupled to the problem via the port and comprising at least one non-structural variable;
   a port collecting module that collects a deferred port list comprising one or more ports in the model that need a sub-problem and that generated inferred sub-problems in the first solving session; and
   a constraint creating module that for each created runtime constraint for the model, propagates the constraint and determines if the propagation generates a conflict, and if the propagation generates a conflict, dismisses the constraint and reverts the model to a state before the constraint was propagated;
   wherein the current solving session is resumed by a user after the first solving session has been stopped.

9. The constraint solver of claim 8, wherein the runtime constraint comprises an arbitrary association of a problem from the first solving session.

10. The constraint solver of claim 8, wherein the solver is a product configurator and the sub-problem is a component.

11. The constraint solver of claim 8, wherein the solver is a dynamic constraint solver.

12. A computer implemented method for solving a constraint satisfaction problem model, the method comprising:
    receiving a request for a current solving session to recreate a first solving session for the model, wherein the model comprises at least one problem comprising at least one non-structural variable and a port, and at least one sub-problem coupled to the problem via the port and comprising at least one non-structural variable;
    collecting a deferred port list comprising one or more ports in the model that need a sub-problem and that generated inferred sub-problems in the first solving session;
    creating one or more runtime constraints for the model; for each of the created runtime constraints, propagating the constraint and determining if the propagation generates a conflict; and
    if the propagation generates a conflict, dismissing the constraint and reverting the model to a state before the constraint was propagated;
    wherein the current solving session is resumed by a user after the first solving session has been stopped, and the model may have changed from the first solving session to when the current solving session is resumed.

13. The method of claim 12, wherein the runtime constraint comprises an arbitrary association of a problem from the first solving session.

14. The method of claim 12, wherein the model is a product configurator and the sub-problem is a component.

15. The method of claim 12, wherein the solving comprises a dynamic constraint.

16. The method of claim 12, further comprising:
    displaying the dismissed constraints in a user interface.

* * * * *

UNITED STATES PATENT AND TRADEMARK OFFICE
CERTIFICATE OF CORRECTION

| | | |
|---|---|---|
| PATENT NO. | : 8,165,981 B2 | Page 1 of 1 |
| APPLICATION NO. | : 12/430600 | |
| DATED | : April 24, 2012 | |
| INVENTOR(S) | : Colena et al. | |

It is certified that error appears in the above-identified patent and that said Letters Patent is hereby corrected as shown below:

On page 2, in column 2, under "Other Publications", line 6, delete "Constraing" and insert -- Constraint --, therefor.

Signed and Sealed this
Seventh Day of August, 2012

David J. Kappos
*Director of the United States Patent and Trademark Office*